(12) United States Patent
Mackay et al.

(10) Patent No.: US 6,209,953 B1
(45) Date of Patent: Apr. 3, 2001

(54) COVER FOR INFANT CAR CARRIER

(76) Inventors: David Mackay; Tracey Mackay, both of 11 Nash Street, Westborough, MA (US) 01581; Elaine K. DeBilzan, 2019 N. 6th Street, Bismark, ND (US) 58501

( * ) Notice: Subject to any disclaimer, the term of this patent is extended or adjusted under 35 U.S.C. 154(b) by 0 days.

(21) Appl. No.: 09/293,627

(22) Filed: Apr. 16, 1999

Related U.S. Application Data

(60) Provisional application No. 60/082,260, filed on Apr. 17, 1998.

(51) Int. Cl.[7] ............... A47C 29/00; A47C 7/66
(52) U.S. Cl. ................ 297/184.13; 297/184.1; 297/184.11; 297/184.12
(58) Field of Search .................. 297/184.13, 184.1, 297/184.11, 184.12

(56) References Cited

U.S. PATENT DOCUMENTS

| | | | |
|---|---|---|---|
| 4,946,221 | * 8/1990 | Livingston | 297/184.13 |
| 5,309,586 | * 5/1994 | Sies et al. | 297/184.13 X |
| 5,363,871 | * 11/1994 | Garrand et al. | 297/184.13 X |
| 5,437,061 | * 8/1995 | Kenner | 297/184.13 X |
| 5,549,354 | * 8/1996 | Rosen | 297/184.13 |
| 5,730,490 | * 3/1998 | Mortenson | 297/184.13 |

* cited by examiner

Primary Examiner—Peter M. Cuomo
Assistant Examiner—Rodney B. White
(74) Attorney, Agent, or Firm—Mirick, O'Connor, DeMallie and Lougee, LLP

(57) ABSTRACT

A cover for an infant car carrier seat of the type which is open facing upward in an inclined position. The cover fits over the upper perimeter of the infant car carrier, to fully enclose the infant reclining or in an inclined position in the carrier. The cover has an opening which is selectively closeable with a flap which can be quietly removably secured across the opening. The opening is aligned with the approximate region of the infant's face, so that the infant can breath easily, and can see out from the cover, and others can see in when the flap is open.

12 Claims, 4 Drawing Sheets

COVER FOR INFANT CAR CARRIER

CROSS REFERENCE TO RELATED APPLICATION

This application is a continuation in part of Provisional Application No. 60/082,260, filed on Apr. 17, 1998.

FIELD OF THE INVENTION

This invention relates to a blanket cover for an infant seat or carrier.

BACKGROUND OF THE INVENTION

Infants are often carried by hand and in the car in an infant seat or carrier which has a frame defining at its top an upwardly-facing opening. When in the seat, the infant is exposed to the elements-sun, wind and cold. In the cold weather, it is thus necessary to bundle the infant in a snowsuit or similar garment, which increases the difficulty of traveling with the infant, and can also make the infant too hot while in the car. Further, the infant retaining strap of the car seat must be loosened to accommodate a heavily dressed infant, and then re-adjusted when the infant is dressed normally.

Infant seat covers have been developed in attempt to address these problems. Two such covers are disclosed in U.S. Pat. Nos. 4,946,221, and 5,309,586. However, the latter is simply a total cover which must be removed when the infant is out of the elements (e.g., buckled into the car seat). The former has an opening, to allow the infant to breathe easily, and to see and be seen. However, the opening also admits the elements which are desired to be blocked, thus decreasing the usefulness of that cover. Any such cover should be as quiet as possible to use, so there is a minimal chance of disturbing the infant.

SUMMARY OF THE INVENTION

It is therefore an object of this invention to provide a protective cover for an infant seat or carrier which solves the problems associated with the prior art covers.

This invention results from the realization that a useful removable protective cover for an infant seat or carrier may be accomplished by including an opening which is selectively closeable with a flap member, to allow the cover to fully cover the infant temporarily while the infant is exposed to the elements, and also to allow the infant to see out (and be seen) while the infant is out of the elements, or in other situations in which a fill cover is not needed or desired.

This invention features a removable protective cover for an infant seat or carrier having a frame defining at its top an upwardly-facing opening, the cover comprising a pliable body member having dimensions sufficient to fit over the top of the frame and fully cover the frame opening. There are means for quietly removably securing the body member to the frame when the body member is covering the opening. There is also an infant face opening in the body member, and a flap member for selectively covering the infant face opening. Also included are means for quietly removably securing the flap member across and covering the infant face opening, to allow an infant in the seat or carrier to be selectively fully covered.

In the preferred embodiment, the means for removably securing the body member to the frame comprises and elastic member, which is preferably sewn into the entire periphery of the body member. Also, the means for removably securing the body member to the frame may comprise a securing member located around the periphery of the body member.

Also in the preferred embodiment, the means for quietly removably securing the flap member comprises a seam formed with the flap member and the body member, and further comprises a two part fastener, one part on the flap member opposite the seam, and the other part on the body member proximate the infant face opening, and opposite from the seam. The fastener is preferably a button type fastener, but may comprise a snap member, toggle and loop, tie, or equivalent fastener.

The body member may be made from a fleece material, a woven material, or a non-woven material.

BRIEF DESCRIPTION OF THE DRAWINGS

Other objects, features and advantages will occur to those skilled in the art from the following description of the preferred embodiment, and the accompanying drawings, in which.

DESCRIPTION OF THE PREFERRED EMBODIMENT

The cover of this invention is made of woven or non-woven cloth, for example fleece, cotton, nylon, or Gortex. The cover carries a means for removably securing the body of the cover to an infant seat or carrier, which secures the cover over and around at least the upper perimeter portion of the infant car carrier. Preferably, the means for removably securing comprises an elastic cord which is sewn into a casing (seam) around at least the periphery of the cover, so that the cover can be stretched over the top of the car carrier. The means for removably securing could alternatively comprise a cord with some means of length adjustment, such as a tie or toggle, or could comprise fasteners such as snaps or mating Velcro portions, which would effectively bunch the cover along its periphery after it was slipped over the car carrier, to prevent the cover from falling off of the carrier. Any other means such as ties, elastic, Velcro, snaps, buttons, or other fasteners could be used, either in the perimeter or not, as long as the cover can be placed over a seat so that it covers the open top, and then later removed.

Figure 1:
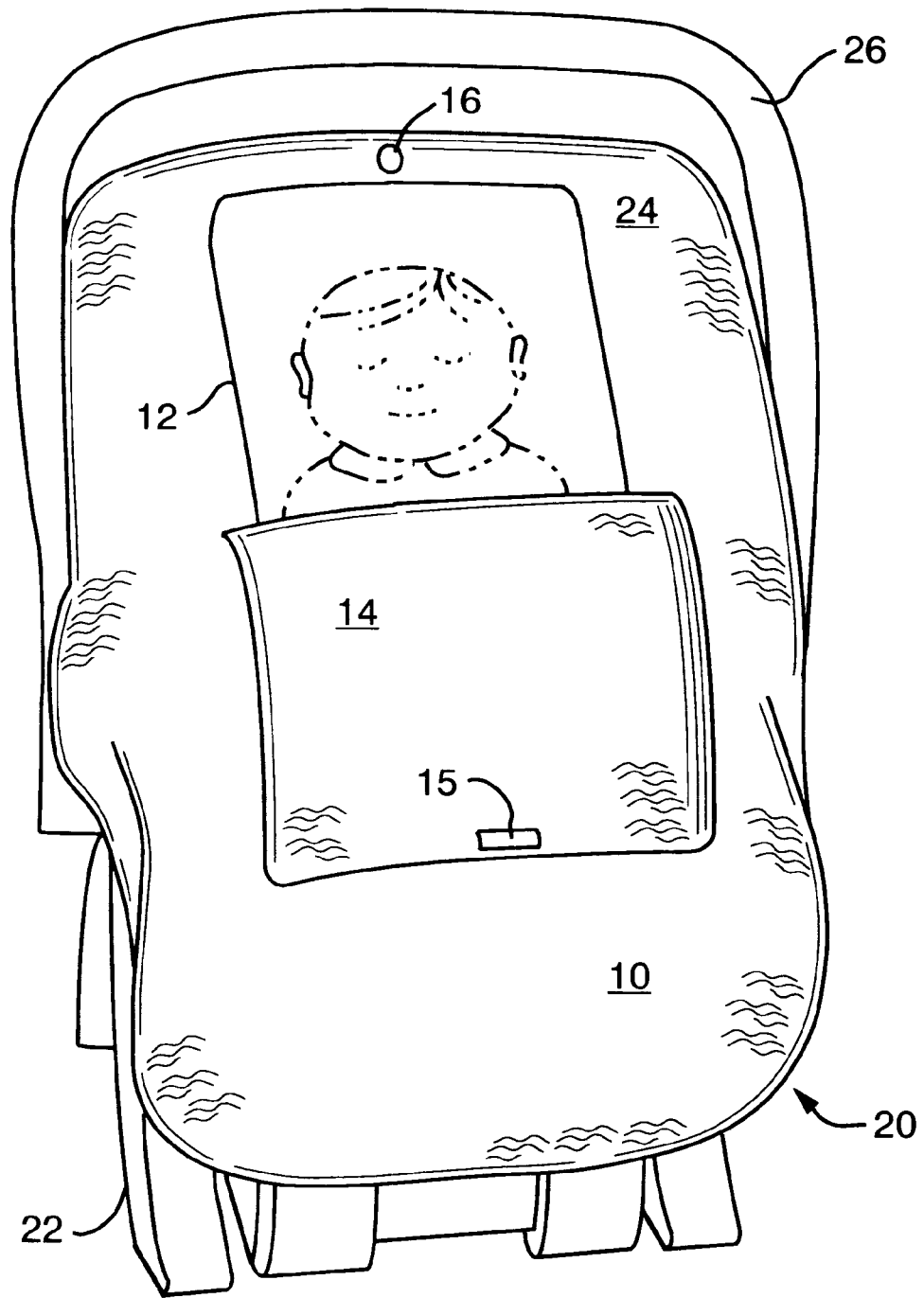
FIG. 1 is a front view of the cover of the invention placed over an infant carrier, with the flap open.
Figure 2:
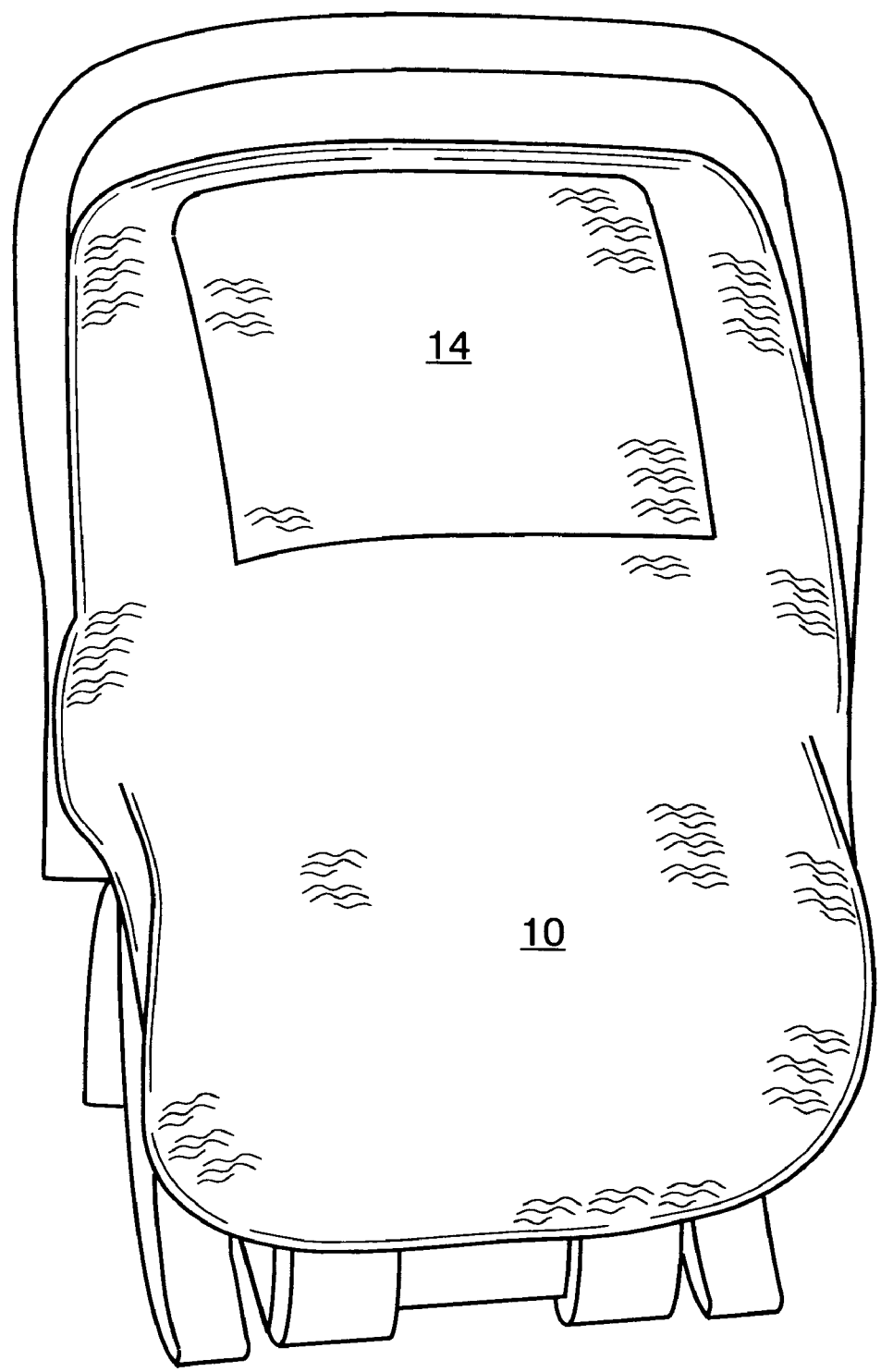
FIG. 2 is the same view, with the flap closed.
Figure 3:
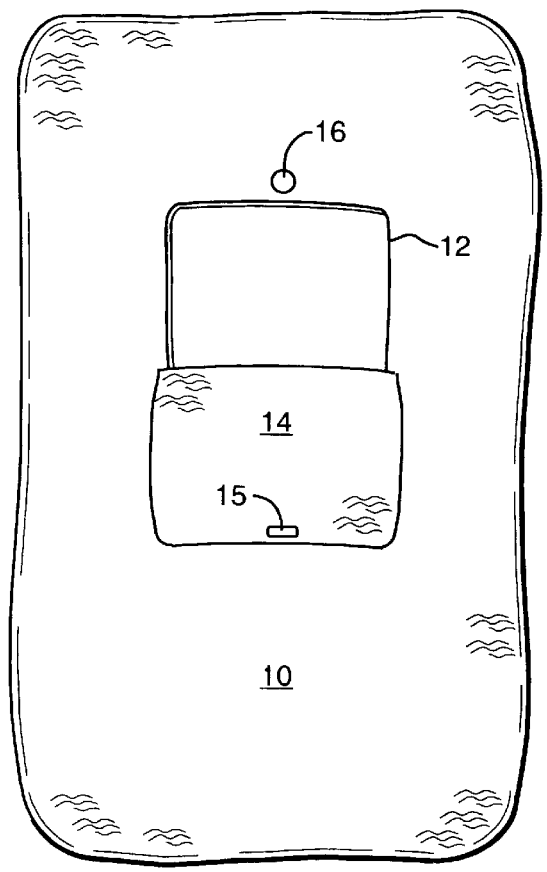
FIG. 3 is a schematic, front view of the cover of the invention, with the flap open.
Figure 4:
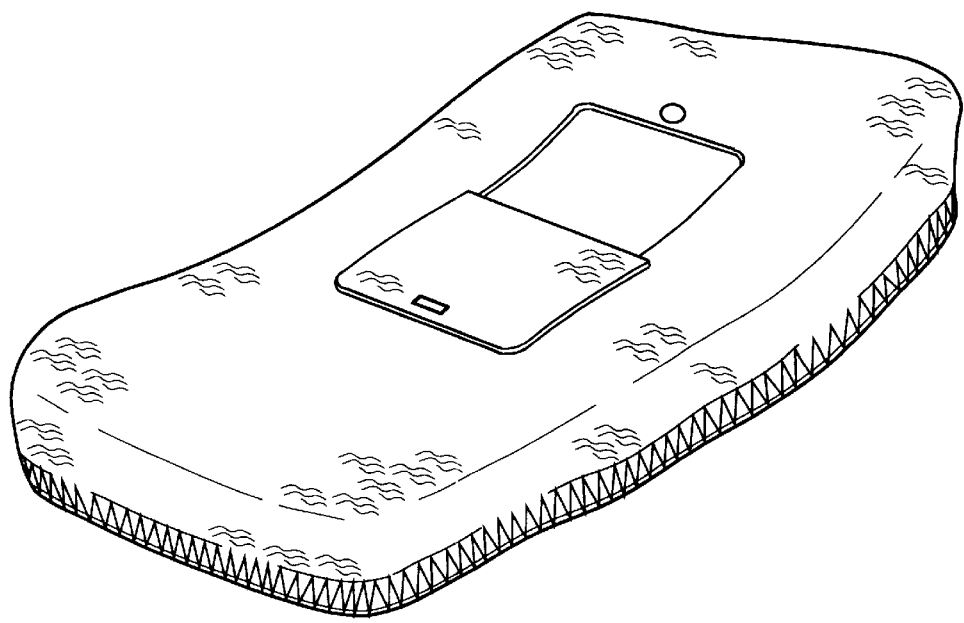
FIG. 4 is an axonometric view of the cover of FIG. 3.
Figure 5A:
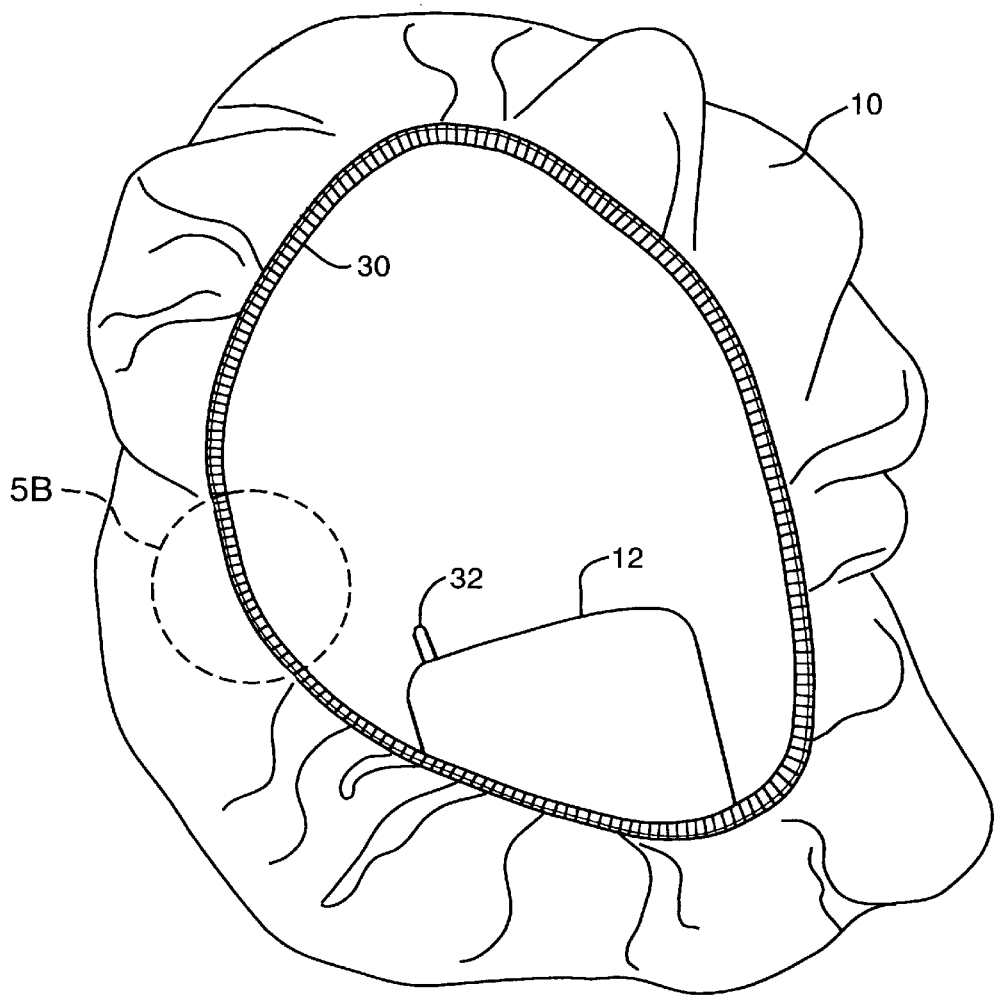
FIG. 5A is a bottom view, showing the opening and the elastic edge.
Figure 5B:
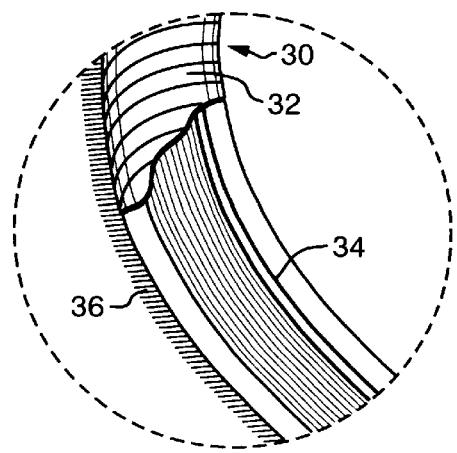
FIG. 5B is a partial, broken-away view of portion "D" of FIG. 5A, detailing the elastic fastener and the casing.

The preferred embodiment of the inventive cover is shown in the drawings. FIG. 1 shows the cover on an infant seat or carrier, with the flap open. FIG. 2 shows the flap closed. FIG. 3 is a top view of the cover, FIG. 4 is an angle view thereof, and FIG. 5A is a bottom view (with an enlarged portion partially in cross section in FIG. 5B, to show the elastic fastener held in the sewn casing).

The cover body 10 is sized and shaped to appropriately fit over the top of the numerous makes of infant car seats or carriers 20 (having frame 22, handle 26, and open-facing top periphery 24) on the market, as would be apparent to one of skill in the field. The flap 14 is just a bit larger than the opening 12, and is sized and shaped appropriately for the size and shape of the opening, so that the flap fully covers the opening when the flap is closed. Flap 14 can be fleece or another material, and could comprise or include a transparent or see through, shaded, member or window. Flap 14 is preferably sewn to the body along one edge (any of the four edges may be attached to the body). Alternatively, the flap can be completely removable by use of any type of securing means, rather than a seam. The flap closure shown comprises a button hole 15 and a button 16, one (16) sewn onto the cover just above the opening, and the other (15) cut on the flap (14). Other fasteners could be used for the flap closure, including snaps, ties, toggles and loops or equivalent means. When the flap 14 is open, the infant's face is visible, and when it is closed, the infant is fully protected from cold, wind, precipitation, and the sun. A small loop 32 (FIG. 5A) may be sewn on the inside of the cover body near a bottom corner of the opening 12, to act as an attachment point for an infant toy or pacifier.

Elastic member or fastener 34 is enclosed in casing 32, which is closed by stitching 36. Elastic 34 is the preferred means for removably securing the body member 10 to the frame 22 when the body member is covering the opening, defined by the frame's top periphery 24. Other such means are also contemplated. For example, the body member could be secured (removably fixed) directly to the seat or carrier, for example by placement of Velcro on the seat and on the body member, or using any of the other contemplated fasteners. Or, the body member could wrap around the seat or carrier, and attach to itself, or attach to the seat by any such means.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A removable protective cover for an infant seat or carrier having a frame defining at its top an upwardly-facing opening having an upper, head end and a lower leg end, comprising:

a pliable cloth body member having dimensions sufficient to fit over the top of the frame and fully cover and closely enclose said opening of said frame, and having a periphery;

means for removably securing said body member only to said seat or carrier when said body member is covering said opening;

a single infant face opening in said body member over the head end of the seat or carrier;

a single flap member permanently fixed to said body member, and also for selectively covering said infant face opening; and, means for quietly removably securing said flap member across and covering said infant face opening, to allow an infant in said seat or carrier to be selectively fully covered.

2. The removable protective cover of claim 1, in which said means for removably securing said body member to said seat or carrier comprises an elastic member.

3. The removable protective cover of claim 2 in which said elastic member is sewn into the entire periphery of said body member.

4. The removable protective cover of claim 1 in which said means for removably securing said body member to said seat or carrier comprises a securing member located around the periphery of said body member.

5. The removable protective cover of claim 1 in which said means for quietly removably securing said flap member comprises a seam formed with said flap member and said body member.

6. The removable protective cover of claim 5 in which said means for quietly removably securing said flap member further comprises a two part fastener, one part on said flap member opposite from said seam, and the other part on said body member proximate said infant face opening and opposite from said seam.

7. The removable protective cover of claim 6 in which said two part fastener comprises a button and button hole type fastener member.

8. The removable protective cover of claim 6 in which said two part fastener comprises a snap member.

9. The removable protective cover of claim 1 in which said body member is made from a fleece material.

10. The removable protective cover of claim 1 in which said body member is made from a woven material.

11. The removable protective cover of claim 1 in which said flap member is at least partially semi-transparent.

12. The removable protective cover of claim 1 in which said means for removably securing said body member includes means for removably fixing said body member to said seat or carrier.

* * * * *